United States Patent [19]
Divita et al.

[11] Patent Number: 5,642,455
[45] Date of Patent: Jun. 24, 1997

[54] MAGNETIC OPTICAL FIBER SKEIN

[75] Inventors: Sam Divita, West Long Branch, N.J.; James C. Lee, Plymouth; James E. Lenz, Brooklyn Park, both of Minn.

[73] Assignee: The United States of America as represented by the Secretary of the Army, Washington, D.C.

[21] Appl. No.: 555,248

[22] Filed: Nov. 8, 1995

[51] Int. Cl.$^6$ .................................................. G02B 6/22
[52] U.S. Cl. ............................... 385/128; 385/134
[58] Field of Search ........................... 385/126, 127, 385/128, 146, 134

[56] References Cited

U.S. PATENT DOCUMENTS 3,701,131  10/1972  Brauser et al. .................. 250/227
4,418,984  12/1983  Wysocki et al. .................. 385/128
4,950,049   8/1990  Darsey et al. .................... 385/134
5,179,613   1/1993  Cronk ................................ 385/128

*Primary Examiner*—John Ngo
*Attorney, Agent, or Firm*—Michael Zelenka; William H. Anderson

[57] ABSTRACT

An optical fiber is releasably held in coil or skein form by a magnetized thin film coating on the fiber. Adjacent convolutions are held together by a magnetic field to prevent unintended unravelling of the coil, but the fiber can be rapidly played out at high speed without rupture and with a constant release tension force. The magnetic field has a radial and axial component relative to the coil cylinder. A magnetizing apparatus is disclosed for magnetizing the film. A sensor feedback loop can dynamically adjust the reel-out drag force to dampen vibration modes during reel out which can cause tangle.

13 Claims, 2 Drawing Sheets

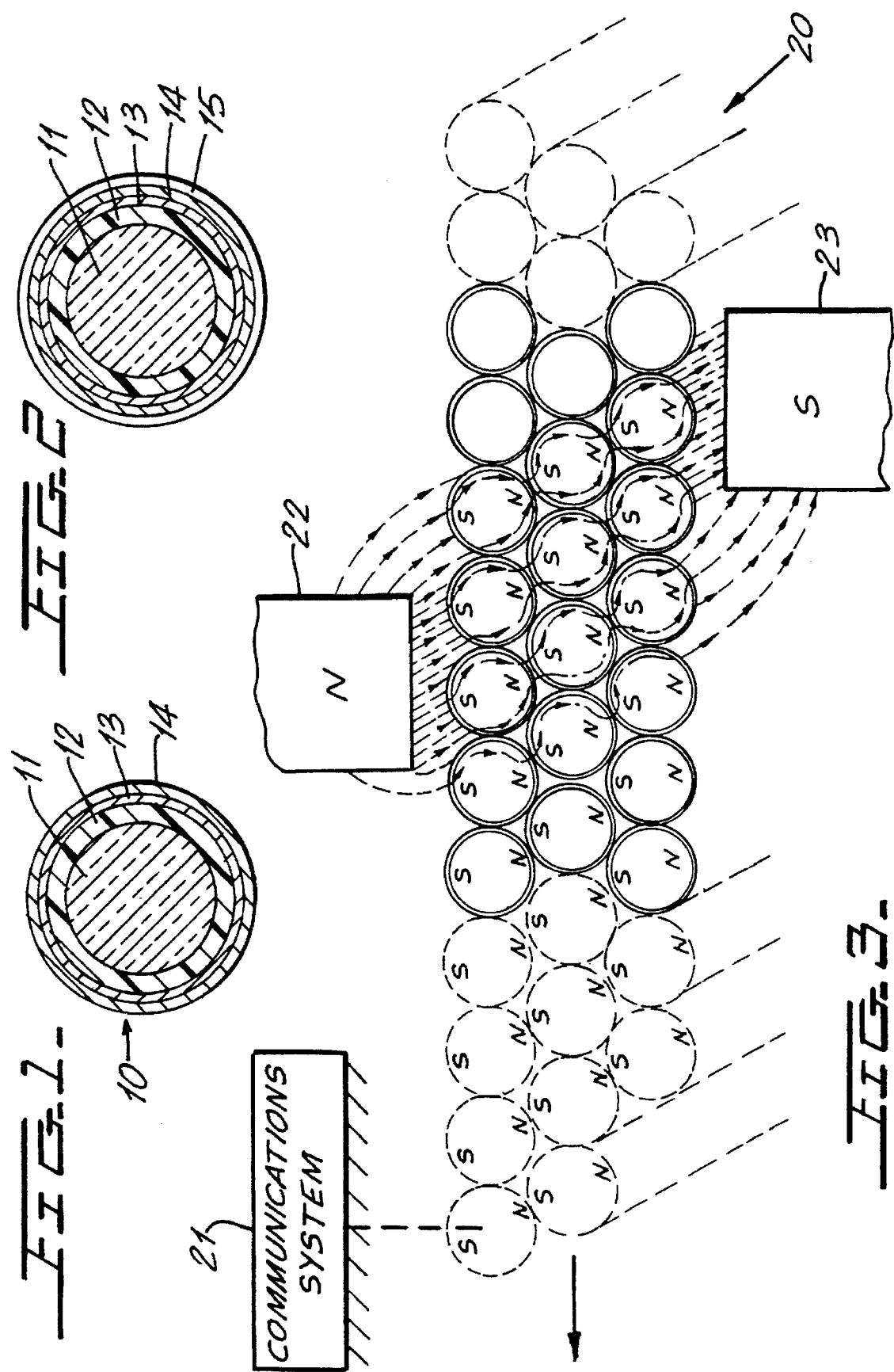

5,642,455

MAGNETIC OPTICAL FIBER SKEIN

GOVERNMENT INTEREST

The invention described herein may be manufactured, used, and licensed by or for the Government of the United States of America, without the payment to me of any royalty thereon.

FIELD OF THE INVENTION

This invention relates to the packaging of optical fiber which can be rapidly unreeled, and more specifically relates to the packaging of optical fiber in which the fiber convolutions of the package are releasably held together by magnetic forces.

BACKGROUND OF THE INVENTION

Optical fiber for communication purposes is well known. Optical fiber is commonly wound in a coil or skein which can be rapidly paid out, for example, behind a missile which is controlled by signals conducted by the fiber from a remote controller to adjust the flight path of the missile.

The state of the art payout system for optical fiber guided missile systems employs precision helically wound, center fed skeins of fiber. This reel-less configuration is mechanically simple, with no rotating inertial mass, which could lead to fiber breakage during missile deployment due to tensile stress. However, a major weakness of this construction is its intrinsic lack of mechanical integrity and tendency to spontaneously unravel. Hence this "twine ball" payout approach requires a containment system which can be adjusted to withstand a wide range of conditions during use. For example, it must maintain the necessary precision wound construction during the vibration "g" loading and under environmental extremes expected during a mission such as extremes of temperature and humidity, yet be not so rigidly constrained as to cause undue tensile stress on the fiber during payout.

Organic low tack adhesives are known for this purpose. The prior art has involved impregnating wound skeins with such low tack materials. The problem with this technique is the difficulty of achieving impregnation uniformity throughout the multiple layers of the skein. U.S. Pat. No. 4,950,049 to Darsey et al. addresses this problem by first pre-coating the fiber strand with a uniform layer of adhesive, and then winding. The adhesive is a thermally activated organic adhesive. The process sequence first applies the adhesive to the fiber in a zero tack state, then precision winding, and then thermally activating the adhesive system to tackiness. This achieves a bound precision wound skein, free of the microbending and built-in stresses inevitable in directly winding sticky fiber. However, with this approach, aging degradation and tackiness drift with temperature and humidity are still major problems upsetting the fine tuning required for reliable payout. Moreover, by their very nature, low tack adhesives are also likely to be low modulus materials with a thickness on the order of the fiber diameter (about 125 microns) so that, during storage, the twined fibers have a tendency to take a deformation set at bearing contact points, farther disrupting skein payout evenness.

Winding processes are also well known for such prior art arrangements. Thus, U.S. Pat. No. 5,179,613 to Cronk describes a typical process for forming a self-supporting coil of optical fiber which has convolutions adhered together by a thermoplastic adhesive.

SUMMARY OF THE INVENTION

In accordance with the present invention, the adhesive of the prior art is replaced by magnetic adhesion means on or in the optical fiber which is responsive to a magnetic field in order to releasably hold together the adjacent convolutions of the optical fiber in its package, so that at least one end of the package can be rapidly unreeled or played out with a relatively constant release force. In the preferred embodiment of the invention, the magnetic adhesion means consists of a thin film of ferromagnetic material which coats the full surface of the optical fiber and can be permanently magnetized to have a small residual field. Adjacent convolutions of the coil will then releasably adhere to one another with a constant release tension.

In the following, the package can have a coil or skein form (which terms are interchangeably used) and can be fed preferably from the interior of a spool-less package, although the invention also is applicable to a multilayer cylindrical coil fed from the outside. The magnetic adhesive means can be disposed intermittently along the length of the fiber but is preferably a more simply formed continuous thin film coating.

There are several approaches to using magnetics to cohesively bundle such coated fiber into a sturdy skein, each taking advantage of the wide range of magnetic properties possible for magnetic materials. For example, by coating the fiber with a thin layer of magnetically soft material (i.e., a magnetizable material which does not maintain a remnant permanent magnetization such as certain Ni-Fe (permalloy) alloys), application of an external magnetic field will induce magnetization resulting in bundling self-assembling forces holding the coil structure together. For reasonable coil dimensions, a magnetic circuit topology can be used which, in conjunction with the fiber coating magnetic properties, will achieve a nearly constant release force independent of payout velocity using only static fields.

The present invention provides a further advantage over the single tackiness adhesive approach of permitting a change in the cohesive bundling and release forces by modulating the magnetic field. Further, in combination with a sensor-feedback loop, the ability to dynamically adjust the reel-out drag force could be used to dampen tangle causing guitar string-like modes along the fiber.

It is also possible to use a hard magnetic coating (i.e., a coating that is permanently magnetizable). The advantage of this approach is that no additional external field magnet assembly is required to bind the package, since the inter-fiber bundling forces are provided by the magnetized coating itself. A skewed magnetic field orientation pattern within the helical winding layers may also be used. In this way, magnetic forces bind the coil windings both laterally as well as vertically between coil layers.

Obviously, apparatus now used for packaging coils or skeins with polymer adhesives can be easily modified to wind fiber with the magnetic adhesion structure of the invention.

The magnetic coating can be applied to the fiber by any number of techniques including Physical Vapor Deposition (PVD e.g., sputtering or e-beam evaporation) and chemical plating processes (either electroless or electrochemical). The magnetic coating properties (B-H loop characteristics, thickness, etc.), the polymer protective jacketing layer (its thickness, stiffness, etc.), and protection (e.g., an additional layer or surface treatment to fine tune fiber surface friction properties) are all designed with trade-offs for optimum performance.

Note that the use of a metal jacket on fiber per se, as used in the application described herein, is useful even in the absence of its magnetic properties. Thus, the ferromagnetic layer can act as additional environmental protection against uv degradation and/or solvent attack of the polymer protective jacket. Such a coating, particularly if applied in a state of tensile stress, adds considerable mechanical stability to the structure and, in particular, considerably mitigates the deformation set problem of such fibers when they are wound by compressively distributing the set inducing forces over the whole structure. Furthermore, the magnetic field from the coated fiber could be used with an industrial circuit for power generation. As the fiber is wound or unwound past a pick-up coil, the induced electromagnetic force will provide a source of electrical power.

BRIEF DESCRIPTION OF THE DRAWINGS

These and other objects, features and details of the invention will become apparent in light of the ensuing detailed disclosure, and particularly in light of the drawings wherein:

FIG. 1 is a cross-section through an optical fiber which is coated in accordance with the invention.

FIG. 2 is a cross-section like that of FIG. 1 of a second embodiment of the invention.

FIG. 3 is cross-section of a portion of a coil or skein of optical fiber with magnetic adherence means in a magnetic field for magnetizing the coil.

DETAILED DESCRIPTION OF THE DRAWINGS

Figure 4:
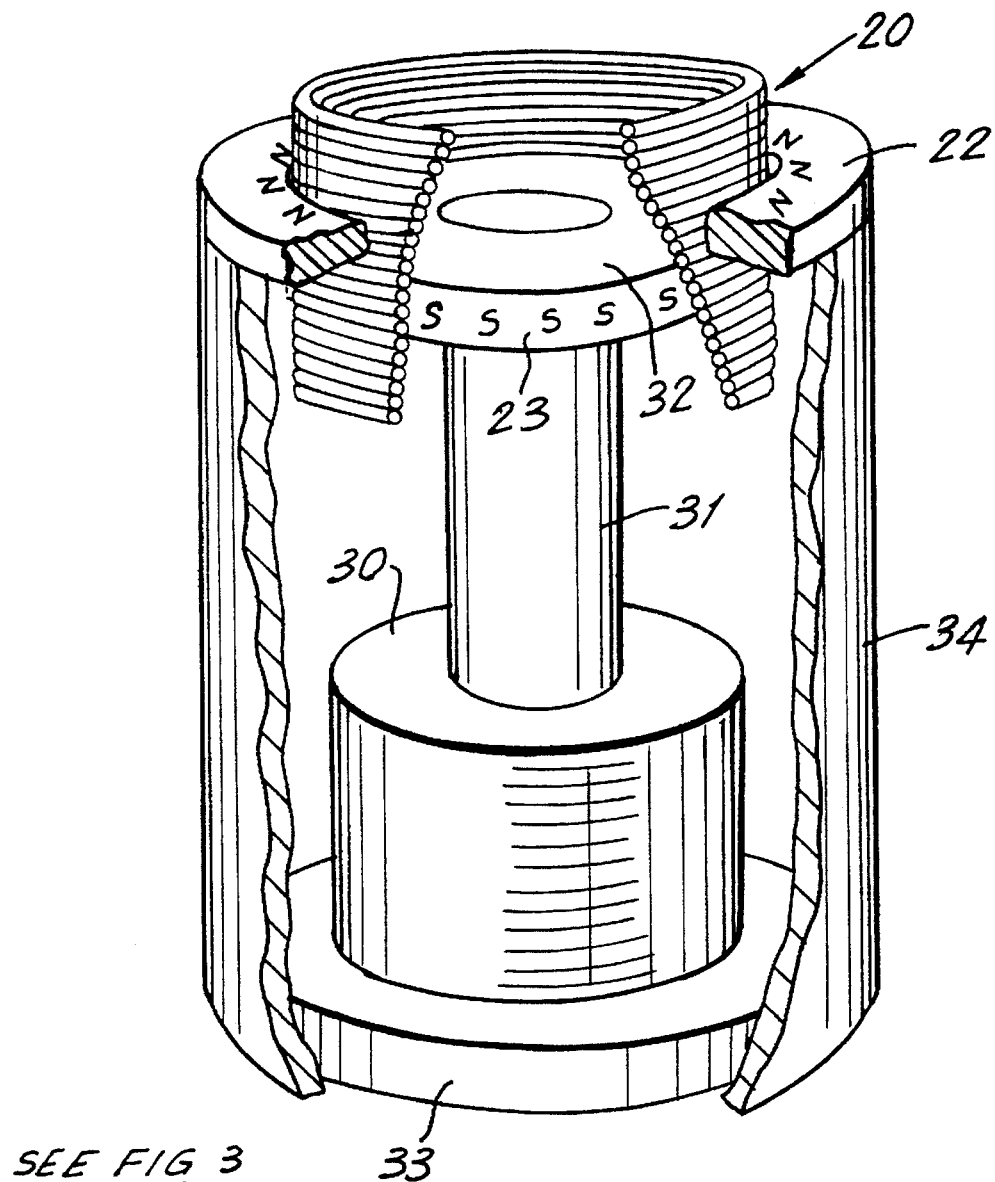
FIG. 4 is a perspective view, partly broken away of apparatus for skew-magnetizing a coil of coated fibers.

Referring first to FIG. 1, there is shown a cross-section through a length of optical fiber 10 which has a conventional glass fiber 11 which may be about 125 microns in diameter. A protective polymer jacket 12 about 5 microns thick coats the fiber 11. To prepare the polymer 12 so that a subsequent magnetic layer can adhere to the polymer, a thin silver epoxy/electroless copper flash 13 is applied to the surface of polymer 12. Thereafter, and in accordance with the invention, a Ni-Fe magnetic film 14, about 20 microns thick, is electroplated atop the flash 13.

The film 14 is preferably a material having a square hysteresis loop characteristic so that, after being placed in a magnetic field, it will have residual magnetization. Film 14 can be applied by known vapor deposition techniques, by sputtering, by electron beam evaporation, or by electroless or electrochemical plating processes. The application of the film is preferably done with on line fiber drawing processes which are already known in the art. Although it is preferred that the magnetic film 14 be applied onto polymer 12, polymer 12 may be eliminated and magnetic film 14 may be applied directly on fiber 11.

A low friction coating may also be added to the fiber of FIG. 1, as shown in FIG. 2. Thus, in FIG. 2, a polymer 15 about 1 micron thick can be applied to layer 14 to reduce surface friction and control fiber stiffness.

The magnetic layer 14 has uses outside of holding the convolutions of a bundle loosely in place and, for example, can add mechanical stability, protect the core against uv degradation and chemical attack and mitigate the deformation set problem of such fibers wound in coil form. By applying coating 14 to the fiber while it is in tensile stress enhances the above benefits. Further, the magnetic field from the coated fiber could be used with an inductive circuit for power generation. As the fiber is wound or unwound past a pick-up coil, the induced electromagnetic force will provide a source of electrical power.

FIG. 3 shows a cross-section of a portion of a coil 20 wound of the fiber of FIGS. 1 and 2. Thus, the coil is shown as having three layers, wound of a continuous thread, and shows about eight convolutions for each layer. Obviously, any number of layers and any number of turns per layer can be used. Preferably, the coil is wound from inside to outside so that the fiber can be played out from the inner diameter. The last convolution of the coil is connectable to a communications system 21 when the coil has been formed and is in use.

In order to activate the magnetic film 14 of FIGS. 1 and 2, the coil is moved between the annular poles 22 and 23 of a magnetic field generator. Note that the poles 22 and 23 are axially displaced so that the layer 14 on each convolution of the fiber has a remnant magnetization at an angle to the normal to the axis of the coil. Thus, even though the coil windings of adjacent layers of the coil are axially displaced, their north and south poles are aligned.

Figure 5:
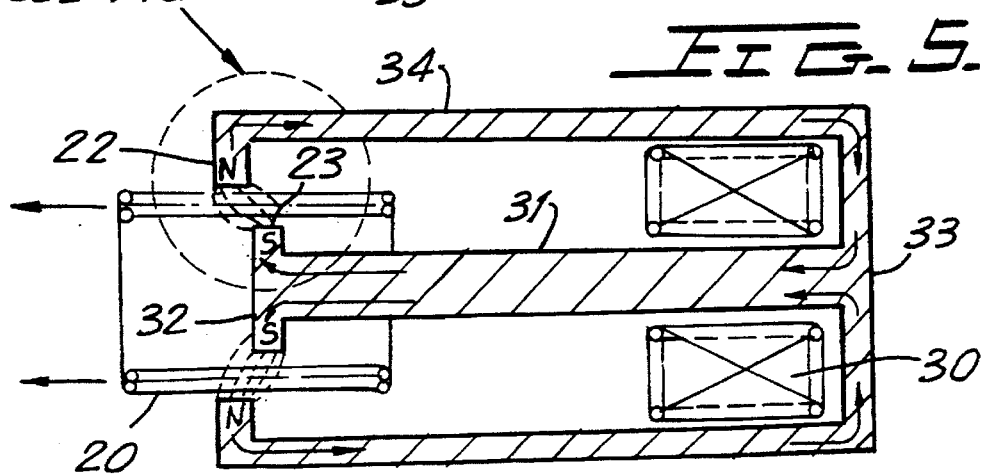
FIG. 5 is a cross-section of FIG. 4 taken along its axis.

FIGS. 4 and 5 show the apparatus for magnetizing film 14 of winding 20 as shown in FIG. 3. Thus, in FIGS. 4 and 5, an electromagnet coil 30 having d-c terminals (not shown) is mounted on a core leg 31 of ferromagnetic material. Core leg 31 is connected between a ferromagnetic top cap 32 and ferromagnetic bottom 33. Bottom 33 is connected to an outer ferromagnetic cylinder 34 which terminates in an inwardly bent lip which corresponds to pole piece 22 in FIG. 3. The outer edge of top cap 32 terminates in a surface corresponding to pole 23 of FIG. 3.

It can now be seen that coil 20 is first inserted in the annular space between core 31 and cylinder 34. The electromagnetic coil 30 is then energized to produce magnetic flux flowing in the direction of the arrows in FIG. 5, producing a constant annular magnetic field between poles 22 and 23. Coil 20 is retracted from the annular volume and through the annular field between pole pieces 22 and 23 to become magnetized as shown in FIG. 3. Thus, the convolutions of the coil will releasably adhere to adjacent convolutions and the coil can be unreeled with a fixed force on the fiber.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A coil of elongated optical fiber that is self supporting and can be unwound from at least one end; the outer surface of said optical fiber having a thin film ferromagnetic coating thereon which is magnetizable for releasably adhering adjacent lengths of said optical fiber to one another.

2. The coil of claim 1 wherein said coil is wound in a cylinder.

3. The coil of claim 1 wherein said coil is a skein which unwinds outwardly from its center.

4. The coil of claim 1 wherein said ferromagnetic coating is magnetically soft and has a relatively low remnant permanent magnetization.

5. The coil of claim 1 wherein said ferromagnetic coating is permanently magnetized.

6. The coil of claim 2 wherein said ferromagnetic coating is magnetized by a magnetic field which forms an angle greater than zero degrees relative to the axis of said cylinder.

7. The coil of claim 2 wherein said ferromagnetic coating is permanently magnetized.

8. The coil of claim 1 which further includes a thin film low friction coating atop said ferromagnetic coating.

9. The coil of claim 8 wherein said coil is wound in a cylinder.

10. The coil of claim 8 wherein said ferromagnetic coating is permanently magnetized.

11. An adherent elongated strand material, which comprises:

a length of elongated strand material which is capable of being disposed in a configuration such that a portion of the outer surface thereof becomes juxtaposed to an adjacent and magnetic surface to which said portion of said outer surface of said elongated strand material is to become releasably adhered, wherein said configuration is a cylindrical coil; and a layer of magnetized ferromagnetic material which encloses said outer surface of said elongated strand material, whereby said layer of ferromagnetic material will magnetically and releasably adhere to said magnetic surface.

12. The structure of claim 11 wherein said layer of ferromagnetic material is magnetized by a magnetic field which has both radial and axial components relative to the axis of said cylinder.

13. The coil of claim 11 which further includes a thin film low friction coating atop said magnetized layer.

* * * * *